United States Patent
Hart et al.

(10) Patent No.: US 12,152,533 B2
(45) Date of Patent: Nov. 26, 2024

(54) CHARACTERISING CODES FOR AIRCRAFT

(71) Applicant: ROLLS-ROYCE plc, London (GB)

(72) Inventors: Nigel T. Hart, Derby (GB); Raza Sekha, Derby (GB)

(73) Assignee: Rolls-Royce plc, London (GB)

( * ) Notice: Subject to any disclaimer, the term of this patent is extended or adjusted under 35 U.S.C. 154(b) by 138 days.

(21) Appl. No.: 17/333,851

(22) Filed: May 28, 2021

(65) Prior Publication Data
US 2021/0396178 A1  Dec. 23, 2021

(30) Foreign Application Priority Data
Jun. 17, 2020 (GB) .................... 2009197

(51) Int. Cl.
| F02C 6/20 | (2006.01) |
| B64D 27/10 | (2006.01) |
| B64D 31/06 | (2006.01) |

(52) U.S. Cl.
CPC ........... *F02C 6/20* (2013.01); *B64D 27/10* (2013.01); *B64D 31/06* (2013.01); *F05D 2220/323* (2013.01); *F05D 2270/30* (2013.01)

(58) Field of Classification Search
CPC ...... F02C 6/00; F02C 3/04; F02C 9/28; F05D 2220/32; G06F 16/2465
See application file for complete search history.

(56) References Cited

U.S. PATENT DOCUMENTS

| 6,158,207 A * | 12/2000 | Polenick | ................. F02C 9/42 60/39.13 |
| 9,336,484 B1 | 5/2016 | Iverson | |
| 9,834,317 B2 * | 12/2017 | Besseau | ............... G06F 11/2294 |
| 10,432,119 B2 * | 10/2019 | Choi | ......................... H02P 9/04 |
| 10,866,584 B2 * | 12/2020 | Cella | ...................... G06N 3/045 |
| 2002/0143421 A1 * | 10/2002 | Wetzer | ............. G06Q 10/06315 700/100 |
| 2006/0111871 A1 * | 5/2006 | Winston | ................. G06Q 10/06 702/184 |
| 2014/0129560 A1 | 5/2014 | Grokop et al. | |
| 2017/0183107 A1 | 6/2017 | Brookhart et al. | |

(Continued)

FOREIGN PATENT DOCUMENTS

WO   2019079771 A1   4/2019

OTHER PUBLICATIONS

Subramanian, "How I used Clusterin to analyze ride-sharing data from Uber," Towards Data Science, https://towardsdatascience.com/how-does-uber-use-clustering-43b21e3e6b7d, dated Aug. 26, 2019, retrieved May 13, 2021.

(Continued)

*Primary Examiner* — Thuyhang N Nguyen
(74) *Attorney, Agent, or Firm* — Shumaker & Sieffert, P.A.

(57) ABSTRACT

A computer-implemented method. The method comprising: (a) obtaining a candidate characterising code, the candidate characterising code being indicative of character of an example of a physical system; (b) accessing a database of extant characterising codes, the extant characterising codes being indicative of character of other examples of the physical system; (c) determining a degree of similarity between the candidate characterising code, and at least one of the extant characterising code; and (e) providing, as an output, the results of the comparison.

15 Claims, 6 Drawing Sheets

(56) References Cited

U.S. PATENT DOCUMENTS

| | | |
|---|---|---|
| 2018/0014161 A1 | 1/2018 | Warren et al. |
| 2018/0057172 A1* | 3/2018 | Sautron .................... F02C 3/04 |
| 2019/0226353 A1 | 7/2019 | Karpman et al. |
| 2020/0134510 A1 | 4/2020 | Basel et al. |
| 2021/0003485 A1 | 1/2021 | Wagner et al. |

OTHER PUBLICATIONS

Harrison, "PCA and K-means Clustering of Delta Aircraft," R-Bloggers, https://www.r-bloggers.com/2014/06/pca-and-k-means-clustering-of-delta-aircraft, posted Jun. 22, 2014, retrieved May 13, 2021.

Great Britain search report dated Oct. 22, 2020, issued in GB Patent Application No. 2009198.9.

Ramkishore, Unsupervised Learing with Payton—K-Means and Hierarchical Clustering, https://medium.datadriveninvestor.com/unsupervised-learning-with-python-k-means-and-hierarchical-clustering-f36ceeec919c, dated Nov. 24, 2018, retrieved May 13, 2021.

Great Britain search report dated Oct. 22, 2020, issued in GB Patent Application No. 2009197.1.

Great Britain search report dated Oct. 22, 2020, issued in GB Patent Application No. 2009196.3.

European search report dated Oct. 28, 2021, issued in EP Patent Application No. EP 21174008.

European search report dated Oct. 28, 2021, issued in EP Patent Application No. EP 21174007.

European search report dated Oct. 28, 2021, issued in EP Patent Application No. EP 21174009.

U.S. Office Action, dated Feb. 27, 2023, pp. 1-24, Issued in U.S. Appl. No. 17/333,842, United States Patent and Trademark Office, Alexandria, Virginia.

U.S. Office Action, dated Mar. 31, 2023, pp. 1-26, Issued in U.S. Appl. No. 17/333,868, United States Patent and Trademark Office, Alexandria, Virginia.

US Office Action, dated Oct. 24, 2023, pp. 1-25, issued in U.S. Appl. No. 17/333,868, USPTO, Alexandria, VA.

US Office Action, dated Aug. 30, 2023, pp. 1-18, issued in U.S. Appl. No. 17/333,842, USPTO, Alexandria, VA.

* cited by examiner

UT5C3SL2A2ST2TT2SDT3HT3SD2SU3D3SA2

| UID | Characterising code |
|---|---|
| A7-ALE | UT5C3SL2A2ST2TT2SDT3HT3SD2SU3D3SA2 |
| T5-EIV | UT2C7SL7A1ST1TT3SDT2HT6SD3SU2D3SA3 |
| V4-MSX | UT9C4SL0A6ST9TT4SDT7HT3SD6SU0D2SA2 |
| Q0-SPT | UT5C3SL9A4ST3TT7SDT0HT3SD6SU4D8SA2 |
| A6-QRH | UT0C5SL7A6ST4TT2SDT8HT5SD2SU4D5SA5 |
| U4-CTQ | UT8C3SL3A9ST7TT0SDT2HT2SD4SU8D6SA0 |
| R2-BTT | UT5C3SL0A9ST4TT8SDT2HT7SD8SU6D5SA1 |

FIG. 5

CHARACTERISING CODES FOR AIRCRAFT

CROSS-REFERENCE TO RELATED APPLICATIONS

This specification is based upon and claims the benefit of priority from UK Patent Application Number 2009197.1 filed on 17 Jun. 2020, the entire contents of which are incorporated herein by reference.

BACKGROUND

Technical Field

The present disclosure relates to computer-implemented methods.

Description of the Related Art

Modern systems, particularly those used in aerospace contexts (for example gas turbine engines, electrical distribution systems, and avionics) are being increasingly equipped with sensors and processors, which collect a wealth of usage data. This data can be useful for investigating failures in the systems, and also to enhance maintenance schedules and operating efficiencies.

However the amount of data being generated and stored is prohibitively large, and insights are lost due to the ability to meaningfully explore the datasets. It is desirous then to improve the ability for investigators to explore and derive insights from the vast amount of data generated.

SUMMARY

Accordingly, in an aspect of the disclosure, there is provided a computer-implemented method of creating a database of characterising codes, each characterising code being indicative of character of a respective example of a physical system, the method comprising the steps of performing for each example:
 (a) receiving data including respective values of a plurality of parameters associated with the system;
 (b) identifying, from a plurality of data clusters, a data cluster for each value, said data clusters each defining a range of possible values of the respective parameter;
 (c) assigning each parameter to its identified data cluster;
 (d) generating, from the assigned data clusters, a characterising code for that example including a unique label for each of the identified data clusters; and
 (e) storing the characterising code in a database of characterising codes.

A database created according to this method can allow the physical systems so characterised to be more efficiently managed.

The method may have any one or, to the extent that they are compatible, any combination of the following optional features.

The system may be an aircraft. The aircraft may include one or more gas turbine engines.

The plurality of parameters may include one or more parameters indicative of operating conditions of the gas turbine engine. The plurality of parameters may include one or more parameters indicative of an operation location and/or ambient conditions of the gas turbine engine. The plurality of parameters may include one or more parameters indicative of an operating history of the gas turbine engine.

The characterising code may be stored in the database using a unique identifier of the system as an index. For example, where the system is an aircraft, the unique identifier may be a tail number.

The parameters may include any one, or any combination, or all of: a utilisation time of the gas turbine engine; a number of flights performed by the aircraft; a duration of a flight performed by the aircraft; a take-off altitude of a flight performed by the aircraft; a temperature of the engine during a start-up; a temperature at take-off during a flight performed by the aircraft; a temperature of the engine during a shut-down; a holding time during a flight performed by the aircraft; an average sulphur dioxide level during a flight performed by the aircraft; an average sulphate level during a flight performed by the aircraft; an average level of dust present during a flight performed by the aircraft; an average level of sand present during a flight performed by the aircraft; and one or more locations flown over by the aircraft. The parameters may include: a utilisation time of the gas turbine engine; a temperature of the engine during a start-up; a temperature at take-off during a flight performed by the aircraft; and a temperature of the engine during a shut-down. The parameters may include a number of flights performed by the aircraft; a duration of a flight performed by the aircraft; a take-off altitude of a flight performed by the aircraft; a holding time during a flight performed by the aircraft; and one or more locations flown over by the aircraft. The parameters may include an average sulphur dioxide level during a flight performed by the aircraft; an average sulphate level during a flight performed by the aircraft; an average level of dust present during a flight performed by the aircraft; and an average level of sand present during a flight performed by the aircraft.

Determining a data cluster for each of the plurality of parameters may include using a K-means nearest neighbour classifier. Determining a data cluster for each of the plurality of parameters may include splitting a range of possible parameter values into bins or quartiles. Determining a data cluster for each of the parameters may be performed manually, wherein a user specifies a threshold for each cluster. By way of an example, a user may specify that values for a duration of a flight performed by the aircraft are binned into the following three clusters: less than 4 hours, at least 4 hours and no more than 8 hours, and greater than 8 hours. Such clustering may facilitate the discretisation of flights into short, medium, or long haul flights.

The method may include a preliminary step of analysing values of a plurality of parameters for a set of extant examples of the physical system, and determining from the analysis a size for each data cluster.

The method may further comprise a step, before storing the characterising code in the database of characterising codes, of comparing a distance between the generated characterising code for each example and one or more characterising codes for examples of the same physical system extant in the database, and when the generated characterising code is within a threshold distance from one or more extant characterising codes, associating the generated characterising code with the extant characterising code and storing the association in the database.

The steps (a)-(e) may be repeated, with each received data indicating the values of the plurality of parameters at or during a different time period.

The method may further include the steps of:
 determining an average value for each of the plurality of parameters;

identifying, from a plurality of averaged data clusters, an averaged data cluster for each of the averaged values, said averaged data clusters each defining a range of possible values for the respective parameter;

assigning each parameters to its identified averaged data cluster;

generating, from the assigned averaged data clusters, an averaged characterising code for that example, including a unique label for each of the identified data clusters; and storing the averaged characterising code in a database of averaged characterising codes.

In a further aspect, there is provided a computer network, comprising a processor, memory, and storage, wherein the memory contains machine executable instructions which, when run on the processor, cause the processor to:

(a) receive data including respective values for a plurality of parameters associated with an example of a physical system;

(b) identify, from a plurality of data clusters, a data cluster for each value, said data clusters each defining a range of possible values of the respective parameter;

(c) assign each parameter to its identified data cluster;

(d) generate, from the assigned data clusters, a characterising code for the example including a unique label for each of the identified data clusters;

(e) store the characterising code in a database of characterising codes located in the storage; and (f) repeat steps (a)-(e) for a plurality of example of the physical system.

The memory may contain machine executable instructions which, when run on the processor, cause the processor to perform the computer-implemented method discussed above including any optional features disclosed with reference thereto.

In a further aspect, there is provided a database of characterising codes generated according to the method of the first aspect including any optional features disclosed with reference thereto.

In a further aspect, there is provided a computer-implemented method comprising:

(a) obtaining a candidate characterising code, the candidate characterising code being indicative of character of an example of a physical system;

(b) accessing a database of extant characterising codes, the extant characterising codes being indicative of character of other examples of the physical system;

(c) determining a degree of similarity between the candidate characterising code, and at least one of the extant characterising code; and (e) providing, as an output, the results of the comparison.

The computer-implemented method of this aspect facilitates fast comparisons between examples of physical systems, where previously such comparisons would require significant computational power.

The characterising code may be the same characterising code as referred to above with reference to the other aspects.

The method may have any one or, to the extent that they are compatible, any combination of the following optional features.

The candidate characterising code may be an extant characterising code in the database of characterising codes.

The characterising codes may be formed of a concatenation of cluster labels for a plurality of parameters describing the physical system. If all cluster labels are determined to be identical between the candidate characterising code and one or more of the extant characterising codes, than the candidate characterising code is determined to be a match with that extant characterising code. Each cluster label may signify an average value for the respective parameter.

The system may be an aircraft including a gas turbine engine. The characterising codes may be indicative of operating conditions of the gas turbine engine. The characterising codes may be indicative of an operation location and/or ambient conditions of the gas turbine engine. The characterising codes may be indicative of an operation history of the gas turbine engine. The characterising codes may be indicative of any one of, any combination of, and preferably all of, the following parameters of the gas turbine engine: a utilisation time of the gas turbine engine; a number of flights performed by the aircraft; a duration of a flight performed by the aircraft; a take-off altitude of a flight performed by the aircraft; a temperature of the engine during a start-up; a temperature at take-off during a flight performed by the aircraft; a temperature of the engine during a shut-down; a holding time during a flight performed by the aircraft; an average sulphur dioxide level during a flight performed by the aircraft; an average sulphate level during a flight performed by the aircraft; an average level of dust present during a flight performed by the aircraft; an average level of sand present during a flight performed by the aircraft; and one or more locations flown over by the aircraft.

The method may further comprise, based on the results of the comparison, modifying a maintenance schedule of the gas turbine engine.

The method may further comprise, based on the results of the comparison, modifying a stocking schedule of parts for the gas turbine engine.

Determining a degree of similarity between the candidate characterising code and the extant characterising code may include assigning a weighting value to one or more components of each characterising code. For example, where the characterising code is formed of a concatenation of cluster labels, one or more of the cluster labels may be weighted higher than other cluster labels when the degree of similarity is determined.

In a further aspect, there is provided a computer network comprising a processor, memory, and storage, wherein the memory contains machine executable instructions which, when run on the processor, cause the processor to:

(a) obtain a candidate characterising code, the candidate characterising code being indicative of a character of an example of a physical system;

(b) access a database of extant characterising codes, the extant characterising codes being indicative of character of other examples of the physical system;

(c) determine a degree of similarity between the candidate characterising code, and at least one of the extant characterising codes; and (e) provide, as an output, the results of the comparison.

The memory may contain machine executable instructions which, when run on the processor, cause the processor to perform the computer-implemented method discussed above including any optional features disclosed with reference thereto.

In a further aspect, there is provided a computer-implemented method comprising:

(a) obtaining a plurality of unique identifiers, each unique identifier being associated with a respective characterising code, each characterising code being indicative of character of an example of a same physical system;

(b) accessing a database of characterising codes, and retrieving each respective characterising code;

(c) determining a degree of similarity between each retrieved characterising code; and (d) providing, as an output, the determined degrees of similarity.

The computer-implemented method of this aspect facilitates fast comparisons between examples of physical systems, where previously such comparisons would require significant computational power.

The characterising code may be the same characterising code as referred to above with reference to the other aspects.

In step (c), determining a degree of similarity between each retrieved characterising code may comprise determining one or more parameters, characterised by the characterising code, which are the same or within a threshold distance of the corresponding parameter of the other characterising codes.

The characterising codes may be formed of a concatenation of cluster labels for a plurality of parameters describing the physical system. If all cluster labels between a pair of retrieved characterising codes are determined to be identical, then the pair of characterising codes may be determined to be a match to one another. Each cluster label may signify an average value for the respective parameter.

The system may be an aircraft including a gas turbine engine.

In a further aspect, there is provided a computer-network comprising a processor, memory, and storage, wherein the memory contains machine executable instructions which, when run on the processor, cause the processor to:
(a) obtain a plurality of unique identifiers, each unique identifier being associated with a respective characterising code, each characterising code being indicative of character of an example of a same physical system;
(b) access a database of characterising code, and retrieving each respective characterising code;
(c) determine a degree of similarity between each retrieved characterising code; and
(d) provide, as an output, the determined degree of similarity.

The memory may contain machine executable instructions which, when run on the processor, cause the processor to perform the computer-implemented method discussed above including any optional features disclosed with reference thereto.

Further aspects of the present disclosure provide: a computer program comprising code which, when run on a computer, causes the computer to perform the computer-implemented methods discussed above; a computer readable medium storing a computer program comprising code which, when run on a computer, causes the computer to perform the computer-implemented methods discussed above; and a computer system programmed to perform the computer-implemented methods discussed above.

DESCRIPTION OF THE DRAWINGS

Embodiments of the disclosure will now be described by way of example with reference to the accompanying drawings in which:

FIG. 5 shows a database of characterising codes.

DETAILED DESCRIPTION

Aspects and embodiments of the present disclosure will now be discussed with reference to the accompanying figures. Further aspects and embodiments will be apparent to those skilled in the art.

Figure 1:
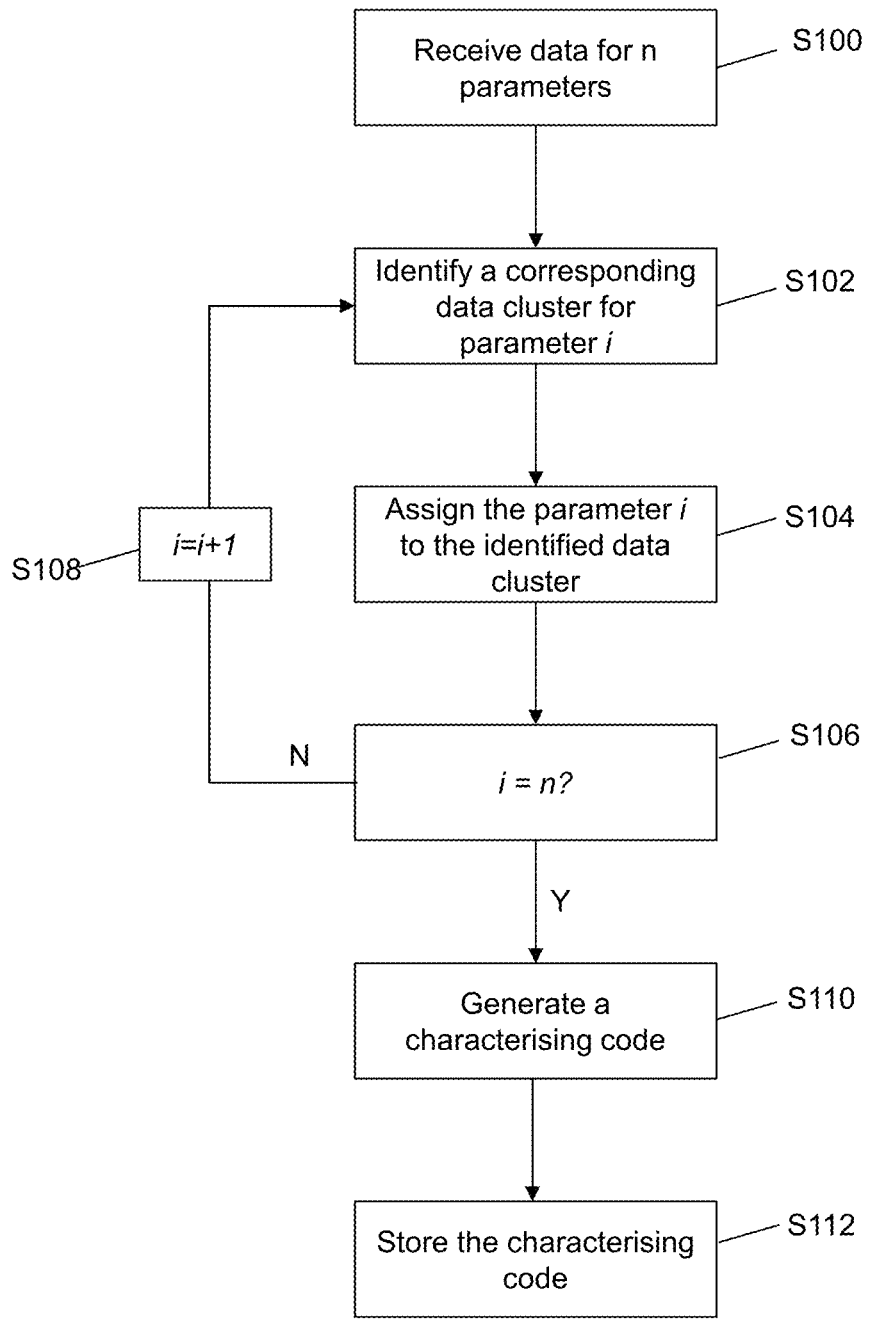
FIG. 1 shows a flow diagram of a computer-implemented method.

FIG. 1 shows a flow diagram of a computer-implemented method. In a first step, S100, data is received which includes the values for a plurality (n) parameters. The parameters are associated with the physical system for which characterising codes are being generated. In this example, the physical system is an aircraft including a gas turbine engine. Accordingly, the parameters are any of those discussed above. However the system could, instead, be an aircraft including any one or more of: a windscreen; doors; windows; tyres; flaps; and paint. The parameters may be descriptive of the state or usage of any of those parts of the aircraft (for example flight time during which the windscreen has been installed, or the number of times the doors have been opened).

Once the data has been received in step S100, the method moves to step S102, where a corresponding data cluster from a plurality of data clusters is identified for an $i^{th}$ parameter of the n parameters. The data clusters each define a range of possible values for the respective parameter. This identification can be performed using a K-means clustering method to identify the corresponding data cluster. The size of the data clusters may be determined by a preliminary step (not shown) of splitting the entire possible range of values for the respective parameter into clusters using a silhouette method.

After the corresponding data cluster has been identified, parameter i is assigned to that data cluster in step S104. Subsequently, a determination is made as to whether all n parameters have had data clusters determined and assigned, i.e. does i=n. If the determination is false 'N', the method moves to step S108, where i is incremented, and the method then returns to step S102 for the next value of i.

Once all parameters have had data clusters identified and assigned (i=n, 'Y') the method moves to step S110 where a characterising code is generated. Preferably, generating the characterising code comprises concatenating each of the identified and assigned data clusters. For example, assigning the parameter i to its identified data cluster may comprise producing a label: [Parameter type][identified Cluster]. To take sector length as an example, if the value of the sector length parameter placed it in the $2^{nd}$ data cluster, the label "SL2" may be produced. Similarly, if the value of the utilisation time placed it in the $5^{th}$ data cluster, the label "UT5" may be produced. Therefore a partial example of a characterising code, formed by the concatenation of the labels, would be "UT5SL2".

The characterising code, generated in step 110, is then stored as per step S112.

The method may further include a step, after step S110, and before S112, of comparing a distance between the characterising code generated in step S110 and one more existing characterising codes for examples of the same physical system. If the distance is less than a threshold distance, the generated characterising code may be associated with the existing characterising code and this association may also be stored in the database. The distance may be a Euclidean distance. The distance may be determined by subtracting the label for the cluster from one characterising code from the corresponding label of another characterising code. For example, to compare the label "SL4" with "SL2", the labels are subtracted to determine a distance of 2 from one to the other. The distances can then be summed for all labels, to determine an overall degree of similarity. Codes with a total difference of zero are identical, and in some examples a threshold distance of 2 is used where codes with a total difference of 2 or less are considered close matches. The total differences between each pair of characterising codes may be stored, and for each characterising code a top 10 closest matches may be determined and provided as an output. In further examples, weightings may be applied to determined differences. For example, such that a cluster 5 to cluster 4 difference (with a distance of 1) is considered more significant than a cluster 4 to cluster 3 difference (also with a distance of 1).

Figures 2, 3:
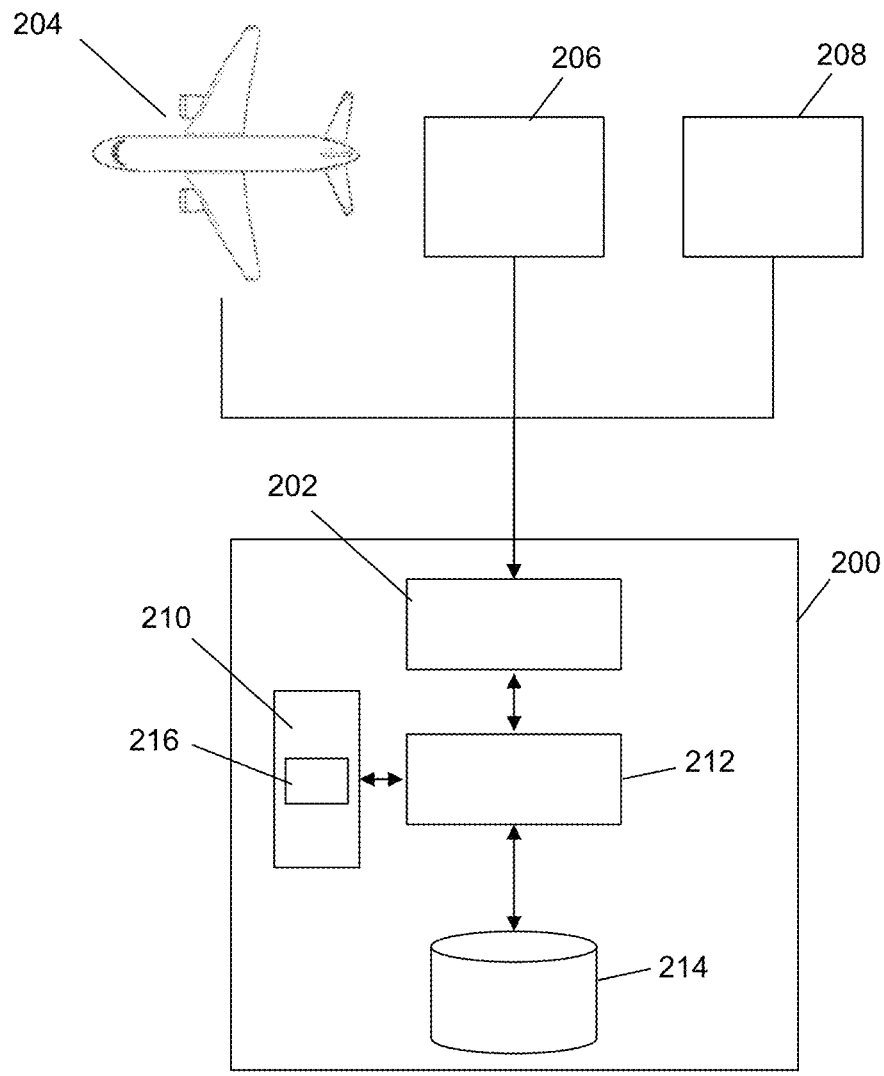
FIG. 2 shows a computer network.
FIG. 3 shows a generated characterising code.

FIG. 2 shows a computer network 200. An input/output device 202 of the network 200, for example a network interface, communicates with a plurality of data sources. These sources include an aircraft 204, which communicates directly with the network 200; an external weather database 206; and an external flight information database 208. The network interface is connected to one or more processors 212, which are connected to memory 210 and storage 214. The memory 210 contains machine executable instructions 216, which when performed on the one or more processors 212 cause the processors to carry out the method discussed with relation to FIG. 1, and/or the method discussed with relation to FIG. 6, and/or the method discussed with relation to FIG. 7.

Figure 4:
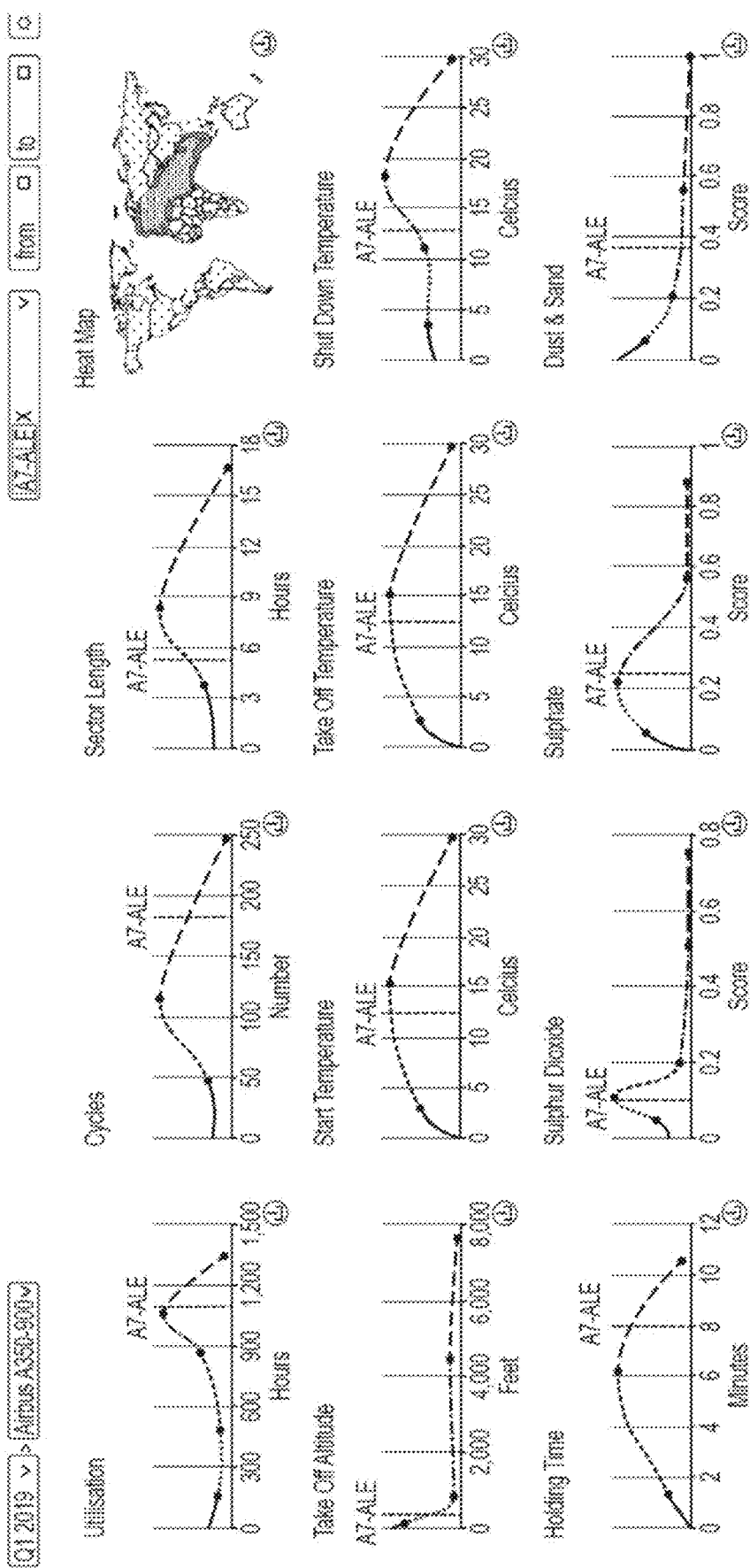
FIG. 4 shows a graphical display of the characterising code of FIG. 3.

FIG. 3 shows a generated characterising code. The characterising code includes cluster identifiers for 12 parameters: utilisation time; cycles; sector length; heat map; take-off altitude; start temperature; take-off temperature; shut-down temperature; holding time; sulphur dioxide content; sulphate content; and dust and sand content. FIG. 4 shows a graphical display of the characterising code of FIG. 3. Notably, it shows where the aircraft described by the characterising code sits relative to its peers. For example, with regards to the utilisation parameter, the aircraft described by this particular characterising code sits towards an upper end of the range of utilisation times.

FIG. 5 shows a database of characterising codes. The database is indexed by a unique identification code, in this instance the aircraft tail number. Each UID is associated with its corresponding characterising code.

Figure 6:
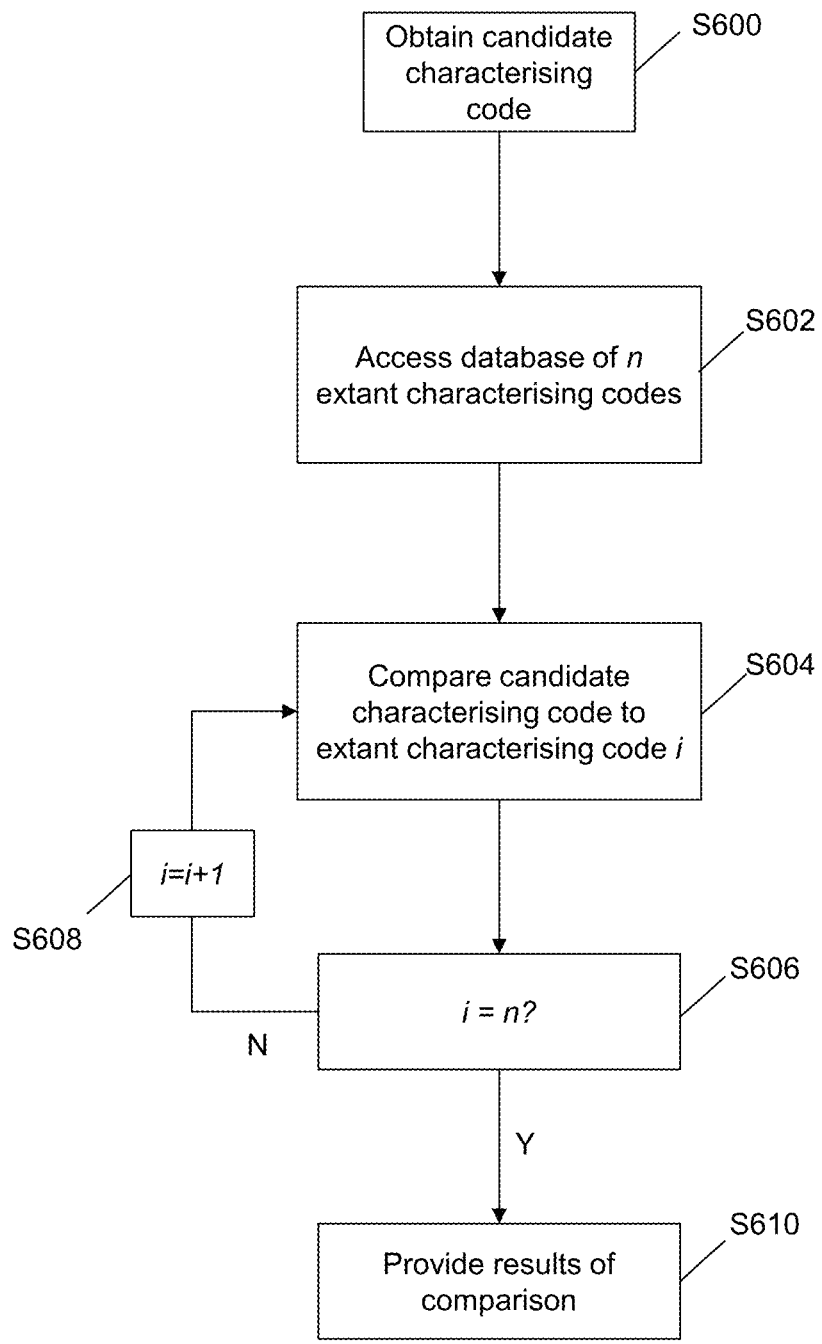
FIG. 6 shows a flow diagram of a computer-implemented method.

FIG. 6 shows a flow diagram of a computer-implemented method of comparing characterising codes. In a first step, S600, a candidate characterising code is obtained. This can be either by generating the characterising code as per the method discussed above, or alternatively by selection of an extant characterising code within a database.

Next, in a step shown in step S602, a database of n extant characterising codes is accessed. This can be the database from which the candidate characterising code is obtained. If so, then clearly the candidate characterising code will be excluded in subsequent comparisons.

Subsequently, in step S604, the candidate characterising code is compared to an $i^{th}$ extant characterising code. An identical characterising code, i.e. one where all duster labels are identical, would be considered a 100% match, and so the examples would be considered identical twins. Next closest matches are assessed by the number of parameters which are in the same cluster, and then for those parameters which are not in the same cluster the distance away from the respective clusters. For example, a parameter within the UT3 cluster would be considered closer to the UT4 cluster than the UT1 cluster. In a further example, some parameters are weighted more than others such that there are considered more important when comparisons are made.

Once the $i^{th}$ extant characterising code has been compared, the method moves to step S606 where it is determined if all characterising codes in the database (bar the candidate, in the example where the candidate was obtained from the database) have been compared with the candidate characterising code i.e. i=n. If not, 'N', the method moves to step S608 where i is incremented and a comparison is performed for the next extant characterising code.

When all extant characterising codes have been compared, 'Y', the method moves to step S610 whereby the results of the comparison are provided. This provision may be, for example, through a graphical interface indicating those extant characterising codes which are identical matches or those characterising codes that fall within a threshold distance from the candidate characterising code. The threshold distance may be set by the operators, for example to be at least 90% similar, at least 80% similar, or at least 70% similar.

Figure 7:
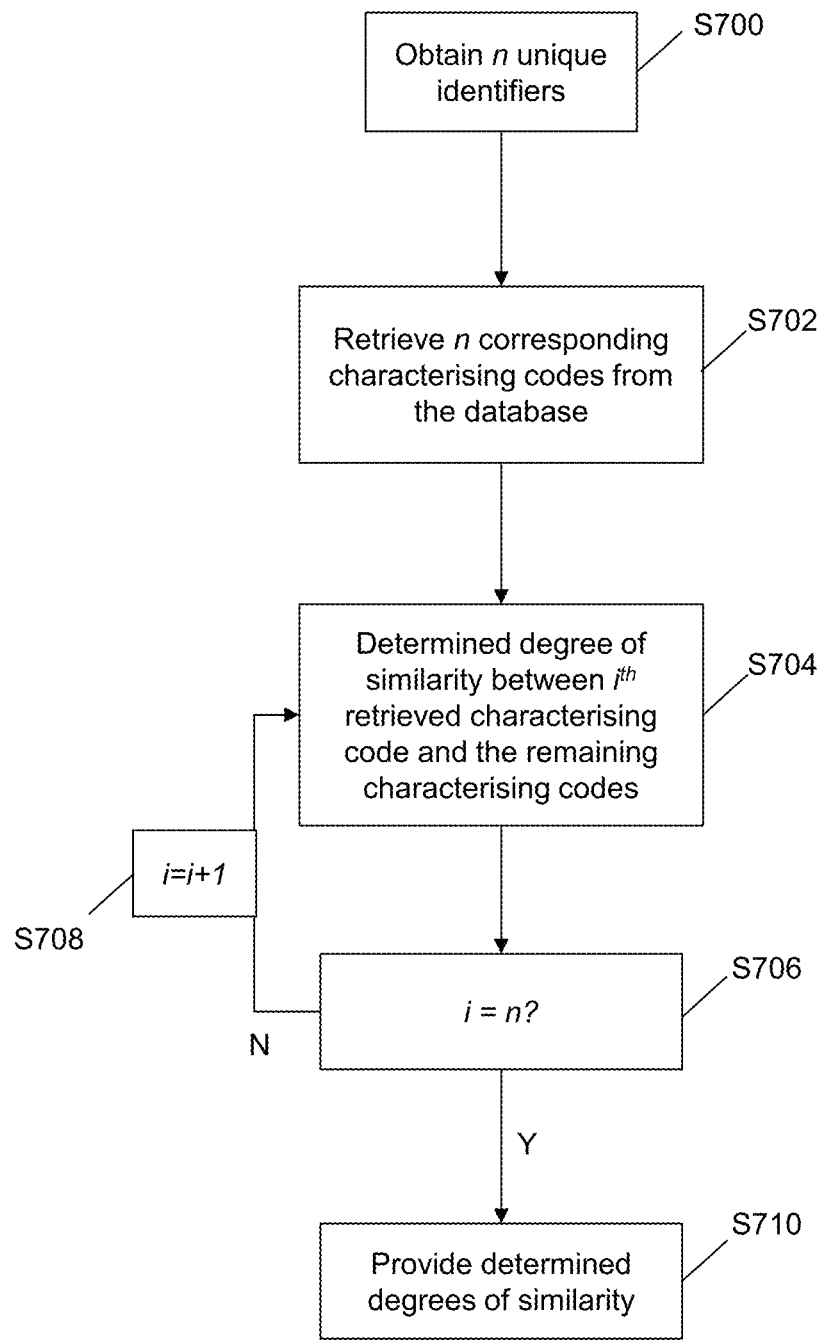
FIG. 7 shows a flow diagram of a computer-implemented method.

In a further method of comparing characterising codes, shown in FIG. 7, a user inputs a plurality of unique identifiers (for example tail numbers for aircraft) in step S700. Using these unique identifiers, the method accesses the database described previously and retrieves the characterising code associated with each of the unique identifiers in step S702. Next, in step S704-S708, a degree of similarity (as discussed previously) is determined between each retrieved characterising code. The result of the determination is then provided to the user in step S710. This can allow a user to quickly identify, between sets of aircraft, which parameters are most shared within the selected sample. This is particularly advantageous when the characterising codes describe a number of parameters higher than would be otherwise analysable. For example, where a set of aircraft have shared the same fault, the method allows the determination of which parameters are most shared between the aircraft and so can provide insight during fault determination.

This allows for a very fast, and computationally easy, comparison of examples of physical systems. For example, where the physical system is an aircraft with a gas turbine engine, it allows for a clear comparison of different flight properties, and a cause of failure or damage can be more readily identified. As an example, if seven engines all had failures, and all had characterising codes indicating the same cluster for flight duration and altitude of take-off, these are likely to be the cause of the issue.

Moreover, this allows the maintenance of aircraft having identical or very similar characterising codes to be optimised. If a particular characterising code pattern is identified as suffering relatively little damage and/or wear in service, then the service intervals for all aircraft containing that characterising code pattern can be increased. If a particular characterising code pattern is identified as suffering relatively high damage and/or wear in service, then the service intervals for all aircraft containing that characterising code pattern can be decreased. This can further provide enhanced control over stock levels.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

We claim:

1. A computer-implemented method comprising:
   obtaining a candidate characterising code, the candidate characterising code being indicative of character of an example of an aircraft including a gas turbine engine;
   accessing a database of extant characterising codes, the extant characterising codes being indicative of character of other examples of the gas turbine engine;
   determining a degree of similarity between the candidate characterising code, and at least one of the extant characterising codes;
   providing, as an output, results of the determination; and
   modifying, based on the results of the determination, a maintenance schedule of the gas turbine engine,
   wherein the candidate characterising code and the extant characterising codes are indicative of the following parameters of the gas turbine engine: a utilisation time of the gas turbine engine; a number of flights performed by the aircraft; a duration of a flight performed by the aircraft; a take-off altitude of a flight performed by the aircraft; a temperature of the engine during a start-up; a temperature at take-off during a flight performed by the aircraft; a temperature of the engine during a shut-down; a holding time during a flight performed by the aircraft; an average sulphur dioxide level during a flight performed by the aircraft; an average sulphate level during a flight performed by the aircraft; an average level of dust present during a flight performed by the aircraft; an average level of sand present during a flight performed by the aircraft; and one or more locations flown over by the aircraft.

2. The computer-implemented method of claim 1, wherein the candidate characterising code is an extant characterising code in the database of extant characterising codes.

3. The computer-implemented method of claim 1, wherein the candidate characterising code and the extant characterising codes are each formed of a concatenation of cluster labels for a plurality of parameters describing the aircraft.

4. The computer-implemented method of claim 3, wherein if all cluster labels are determined to be identical between the candidate characterising code and one or more of the extant characterising codes, then the candidate characterising code is determined to be a match with the one or more of the extant characterising codes.

5. The computer-implemented method of claim 3, wherein each cluster label signifies an average value for the respective parameter.

6. The computer-implemented method of claim 1, wherein the method further comprises, based on the results of the determination, modifying a stocking schedule of parts for the gas turbine engine.

7. The computer-implemented method of claim 1, wherein determining a degree of similarity between the candidate characterising code and the extant characterising codes includes assigning a weighting value to one or more components of each characterising code.

8. The computer-implemented method of claim 1, wherein:
   the example of the aircraft including the gas turbine engine is a first aircraft including a first gas-turbine engine of a plurality of gas turbine engines,
   obtaining the candidate characterising code comprises obtaining, for each respective gas-turbine engine of the plurality of gas turbine engines, a respective candidate characterising code of a plurality of candidate characterising codes,
   determining the degree of similarity comprises determining, for each respective candidate characterising code of the plurality of candidate characterising codes, a respective degree of similarity between the respective characterising code and at least one of the extant characterising codes, and
   providing the results comprises providing, for each respective gas turbine engine, the results of the determination.

9. The computer-implemented method of claim 1, wherein determining the degree of similarity comprises determining one or more parameters indicative of the character, characterised by the characterising code, which are the same or within a threshold distance of the corresponding parameter of other characterising codes.

10. A computer network comprising a processor, memory, and storage, wherein the memory contains machine executable instructions which, when run on the processor, cause the processor to:
    obtain a candidate characterising code, the candidate characterising code being indicative of a character of an example of a physical system, wherein the physical system is an aircraft including a gas turbine engine;
    access a database of extant characterising codes, the extant characterising codes being indicative of character of other examples of the physical system;
    determine a degree of similarity between the candidate characterising code, and at least one of the extant characterising codes;
    provide, as an output, the results of the determination; and
    modify, based on the results of the determination, a maintenance schedule of the gas turbine engine,
    wherein the candidate characterising code and the extant characterising codes are indicative of the following parameters of the gas turbine engine: a utilisation time of the gas turbine engine; a number of flights performed by the aircraft; a duration of a flight performed by the aircraft; a take-off altitude of a flight performed by the aircraft; a temperature of the engine during a start-up; a temperature at take-off during a flight performed by the aircraft; a temperature of the engine during a shut-down; a holding time during a flight performed by the aircraft; an average sulphur dioxide level during a flight performed by the aircraft; an average sulphate level during a flight performed by the aircraft; an average level of dust present during a flight performed by the aircraft; an average level of sand present during a flight performed by the aircraft; and one or more locations flown over by the aircraft.

11. The computer network of claim 10, wherein the candidate characterising code is an extant characterising code in the database of extant characterising codes.

12. The computer network of claim 10, wherein the candidate characterising code and the extant characterising codes are each formed of a concatenation of cluster labels for a plurality of parameters describing the aircraft.

13. The computer network of claim 12, wherein if all cluster labels are determined to be identical between the candidate characterising code and one or more of the extant characterising codes, then the candidate characterising code is determined to be a match with the one or more of the extant characterising codes.

14. The computer network of claim 12, wherein each cluster label signifies an average value for the respective parameter.

15. A computer network comprising a processor, memory, and storage, wherein the memory contains machine executable instructions which, when run on the processor, cause the processor to:

obtain a candidate characterising code, the candidate characterising code being indicative of a character of an example of an aircraft including a gas turbine engine;

access a database of extant characterising codes, the extant characterising codes being indicative of character of other examples of the gas turbine engine;

determine a degree of similarity between the candidate characterising code, and at least one of the extant characterising codes; and modify, based on the results of the determination, a stocking schedule of parts for the gas turbine engine, wherein the candidate characterising code and the extant characterising codes are indicative of the following parameters of the gas turbine engine: a utilisation time of the gas turbine engine; a number of flights performed by the aircraft; a duration of a flight performed by the aircraft; a take-off altitude of a flight performed by the aircraft; a temperature of the engine during a start-up; a temperature at take-off during a flight performed by the aircraft; a temperature of the engine during a shut-down; a holding time during a flight performed by the aircraft; an average sulphur dioxide level during a flight performed by the aircraft; an average sulphate level during a flight performed by the aircraft; an average level of dust present during a flight performed by the aircraft; an average level of sand present during a flight performed by the aircraft; and one or more locations flown over by the aircraft.

* * * * *